Oct. 22, 1935.                L. J. LUNAS                2,018,272
                               ANALYZER
                          Filed Sept. 13, 1934
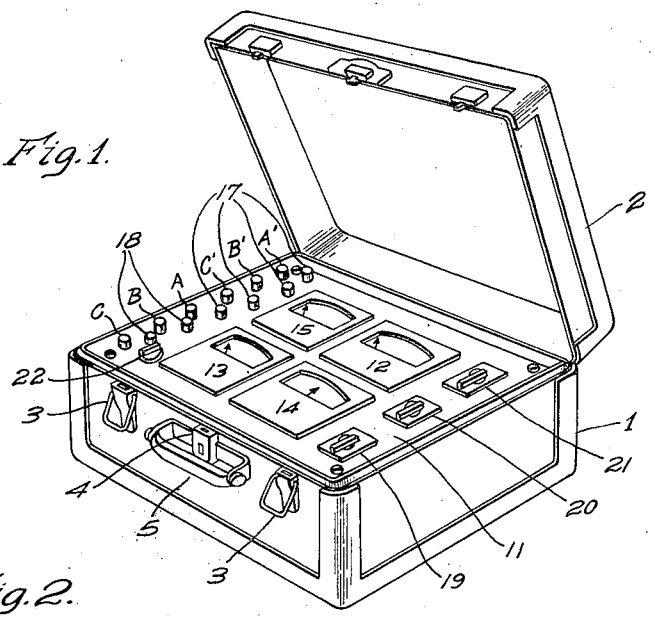
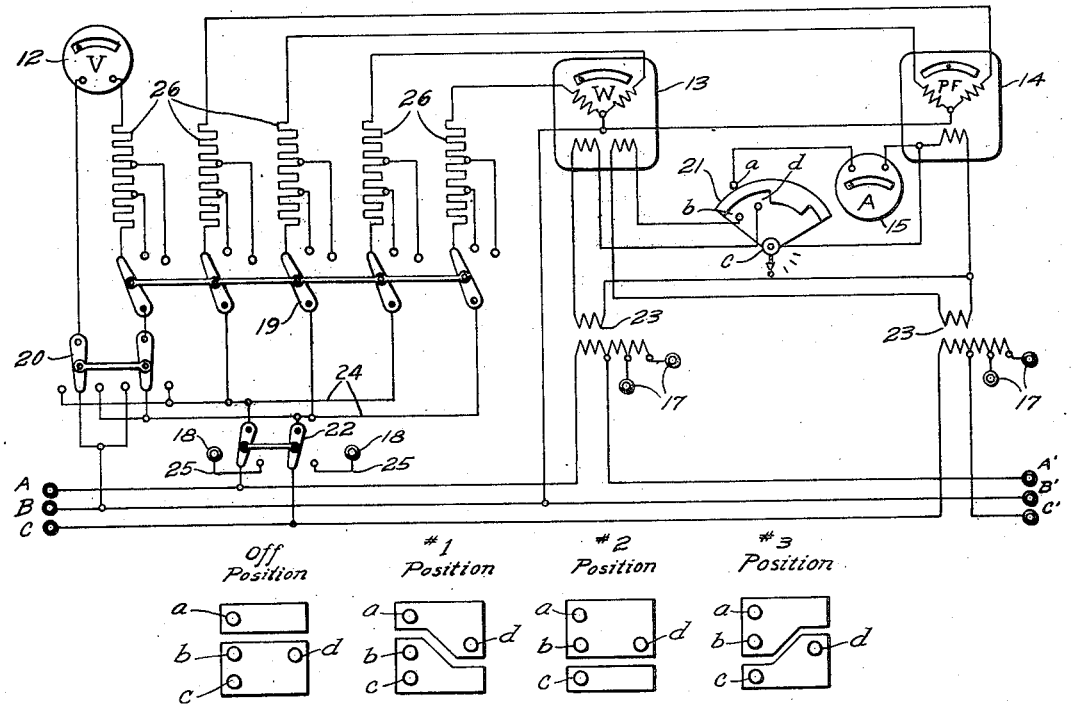
INVENTOR
Lawrence J. Lunas.
BY
ATTORNEY Patented Oct. 22, 1935

2,018,272

UNITED STATES PATENT OFFICE 2,018,272

ANALYZER

Lawrence J. Lunas, Nutley, N. J., assignor to Westinghouse Electric & Manufacturing Company, East Pittsburgh, Pa., a corporation of Pennsylvania Application September 13, 1934, Serial No. 743,856

5 Claims. (Cl. 175—183)

My invention pertains to electrical testing and more particularly to portable apparatus for testing various electrical conditions of industrial alternating-current circuits.

It is an object of my invention to provide an improved portable test set for industrial analysis and testing.

It is a further object of my invention to provide a three-phase alternating current test set which may also be conveniently utilized for single-phase and two-phase testing.

Another object of my invention is to provide a novel instrument circuit for energizing both single-phase and polyphase instruments from a polyphase circuit in such a manner that the voltage and current ranges of all the instruments may be simultaneously changed, and the single-phase instruments may be transferred from one phase to another, under load, without interfering with the operation of the polyphase instruments.

The invention itself, however, both as to its organization and its method of operation, together with additional objects and advantages thereof, will best be understood from the following description of a specific embodiment, when read in conjunction with the accompanying drawing, in which:

Figure 1 is a perspective view showing an embodiment of my invention completely assembled in a portable carrying case;

Fig. 2 is a diagrammatic view representing the electrical circuits provided for interconnecting the instruments in the embodiment of my invention shown in Fig. 1; and Figs. 3, 4, 5, and 6 are diagrammatic views representing the circuit controlling contacts of an ammeter switch, used in the practice of my invention, in four different positions.

Referring more specifically to the drawing, as shown in Fig. 1, my portable industrial analyzer comprises a carrying case 1, provided with a hinged closure member 2 which may be secured in closed protective position by means of latches 3 and a lock 4 and carried by a suitable handle 5 in a manner similar to a suitcase.

An instrument panel 11 is provided in the case for supporting the electrical instruments, terminals and switches. The instruments comprise a voltmeter 12, a polyphase wattmeter 13, a polyphase power factor meter 14, and an ammeter 15, all of which are of rectangular formation for compact assembly in the panel. Although the instruments 12, 13, 14, and 15 may be of any of a variety of forms known in the art, it will be assumed that the wattmeter 13 is of the two-element electro-dynameter type, and the power factor meter 14 is of the crossed-coil electro-dynameter type. The single-phase voltmeter 12 and ammeter 15 are preferably of the iron-vane repulsion type, but may be of any other form suitable for alternating-current service.

Three terminals A, B, and C are provided on the panel for connection with the line side of the circuit to be tested, and three additional terminals A', B', and C' are provided for connection with the load side of the tested circuit. A number of auxiliary current terminals 17 are provided for changing the current ranges of the instruments, as will hereinafter appear, and a pair of auxiliary voltage terminals 18 are provided for energizing the voltage circuits of the analyzer from external potential transformers (not shown) if the voltage of the circuit under test is above the range of the analyzer.

A number of switches 19, 20, 21, and 22 are mounted at convenient locations on the panel 11, for changing the circuits and ranges of the instruments in a manner which will become evident from Fig. 2.

Referring to Fig. 2, which shows the circuit connections of my improved device, the line terminals A and C are connected, in series with a pair of current transformers 23, to the corresponding load terminals A' and C' respectively. The line terminal B is directly connected to the corresponding load terminal B'. The current transformers 23 are provided with primary taps connected to the auxiliary terminals 17, for changing the ratio of current transformation.

A pair of auxiliary voltage conductors 24 are provided for energizing the voltage coils of the voltmeter 12, wattmeter 13 and power factor meter 14 in accordance with a common system of voltages. The auxiliary voltage conductors 24 may be connected directly to the main terminals A and C or to the auxiliary voltage terminals 18 by means of the switch. The auxiliary voltage terminals 18 are connected to contacts of the switch 22 by means of taps 25 in order to permit energization of the auxiliary voltage conductors 24 from external potential transformers (not shown) when testing circuits of voltage above the range of instruments 12, 13, and 14.

One terminal of each voltage coil of the wattmeter 13 and power factor meter 14 is connected directly to the main terminal B. The other terminal of each voltage coil is connected in series with a multiplier resistor 26 and contacts of the switch 19 to one of the auxiliary voltage conductors 24. The voltmeter 12 is similarly connected, except that the switch 20 is interposed between the corresponding multiplier resistor 26 and the energizing conductors, in order to permit the transfer of the voltmeter 12 from one phase to another to permit measurement of the voltage between each pair of main conductors separately.

The current coils of the wattmeter 13 are each connected in series with a secondary winding of one of the current transformers 23. The two branches thus formed are connected at their common junction points with a return branch which includes the current coil of the power factor meter 14. The switch 21 shown diagrammatically in Fig. 2, is a four position switch provided with overlapping contacts arranged to connect the ammeter 15 serially in any one of the three branches of the current circuit without interruption of any of the branches. In a preferred form, the switch 15 may be of the drum type, having contacts a, b, c, and d arranged as shown diagrammatically in Figs. 3 to 6.

The operation of the apparatus shown in Fig. 2 may be set forth as follows: To test a three-phase, three-wire circuit, the terminals A, B, and C are connected on the line side of the circuit to be tested, and the terminals A', B', and C' on the load side. If the phase sequence of connections has been incorrectly chosen, the needle of the power factor meter 14 will move against one of its stops. The proper phase sequence of connections may then be established by transposing the connections to any two line terminals such as A and B, and transposing the connections to the corresponding load terminals, such as A' and B'. If the voltage of the circuit under test is too low to produce proper deflection of the instruments with the switches in the positions shown, the switch 19 may be moved to the right to reduce the voltage necessary for full-scale voltage deflection. For voltages above the range of the device, external potential transformers are connected to the terminals 18, as mentioned above, and the switch 22 is moved to the right.

To increase the current deflection, the load connections are removed from the terminals A' and C' and applied to a pair of corresponding auxiliary terminals 17. The switches 20 and 21 are operated to transfer the voltmeter 12 and ammeter 15, respectively, from one phase to another.

Two-phase three-wire circuits may be tested in the same way as three-phase three-wire circuits. Single-phase circuits may be tested by using only line terminals A and B and load terminals A' and B'. With the connections shown, the indication of wattmeter 13 is correct for any form of two-wire or three-wire circuit, regardless of load balance or number of phases. The power factor meter 13, however, operates correctly only on balanced three-phase, three-wire circuits. However, the power factor of single-phase and two-phase circuits may be easily calculated from wattmeter, voltmeter and ammeter readings.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a device for measuring electrical characteristics of an alternating-current circuit having at least three main conductors, a pair of voltage taps to be energized in accordance with voltages derived from a first and second of said main conductors, a pair of voltage conductors, means for selectively connecting said voltage conductors directly to said first and second main conductors or to said voltage taps, a polyphase meter responsive to a condition dependent on a plurality of voltages, said meter having voltage coils connected between each of said voltage conductors and the third of said main conductors, a single phase voltmeter, and switch means for connecting said voltmeter to any two conductors of the group consisting of said pair of voltage conductors and said third main conductor.

2. In a device for measuring electrical characteristics of an alternating-current circuit having at least three main conductors, a pair of voltage taps to be energized in accordance with voltages derived from a first and second of said main conductors, a pair of voltage conductors, means for selectively connecting said voltage conductors directly to said first and second main conductors or to said voltage taps, a polyphase meter responsive to a condition dependent on a plurality of voltages, said meter having voltage coils connected between each of said voltage conductors and the third of said main conductors, a single-phase voltmeter, switch means for connecting said voltmeter to any two conductors of the group consisting of said pair of voltage conductors and said third main conductor, tapped multiplier resistors for said polyphase meter and said voltmeter, and a common switch means for simultaneously controlling said multiplier resistors.

3. In a device for measuring electrical characteristics of an alternating-current circuit having at least three main conductors, a pair of voltage taps to be energized in accordance with voltages derived from a first and second of said main conductors, a pair of voltage conductors, means for selectively connecting said voltage conductors directly to said first and second main conductors or to said voltage taps, a polyphase meter responsive to a condition dependent on a plurality of voltages and a plurality of currents, said meter having voltage coils connected between each of said voltage conductors and the third of said main conductors and having a pair of current coils, a pair of current transformers energized in accordance with the currents in said first and second main conductors, conductors completing a divided circuit having two main branches and a return branch joined together at both ends, said main branches each including a secondary winding of one of said current transformers and one of said current coils, a single-phase voltmeter, a single-phase ammeter, switch means for connecting said voltmeter to any two conductors of the group consisting of said pair of voltage conductors and said third main conductor, and switch means for connecting said ammeter in any of said main or return branches.

4. In a device for measuring electrical characteristics of an alternating-current circuit having at least three main conductors, a pair of polyphase meters responsive to conditions dependent on a plurality of voltages and on predetermined current conditions, each of said meters having a pair of voltage coils and current coil means, means for energizing said current coil means in accordance with current conditions derived solely from a first and second of said main conductors, a tapped multiplier resistor for each of said voltage coils, conductors completing energizing circuits for said voltage coils, each of said energizing circuits including a voltage coil and a multiplier resistor, each of said energizing circuits being energized solely in accordance with the voltage between the third of said main conductors and one of said first or second main conductors, and a common switch means for simultaneously controlling said multiplier resistors.

5. In a device for measuring electrical characteristics of an alternating-current circuit having at least three main conductors, a meter having a voltage coil, a polyphase meter responsive to a condition dependent on a plurality of voltages and on predetermined current conditions, said polyphase meter having a pair of voltage coils and current coil means, means for energizing said current coil means in accordance with current conditions derived solely from a first and second of said main conductors, a plurality of tapped multiplier resistors, conductors completing energizing circuits for said voltage coils, each of said energizing circuits including a voltage coil and a multiplier resistor, each of said energizing circuits being energized solely in accordance with the voltage between the third of said main conductors and one of said first or second main conductors, and a common switch means for simultaneously controlling said multiplier resistors.

LAWRENCE J. LUNAS.